US00RE50354E

(19) United States
(12) Reissued Patent
Bjarnason et al.

(10) Patent Number: US RE50,354 E
(45) Date of Reissued Patent: Mar. 25, 2025

(54) AUTOMATIC DETECTION OF MALICIOUS PACKETS IN DDOS ATTACKS USING AN ENCODING SCHEME

(71) Applicant: Arbor Networks, Inc., Westford, MA (US)

(72) Inventors: Steinthor Bjarnason, Fjerdingby (NO); Andrew Ralph Beard, Roanoke, VA (US); David Turnbull, Stanmore (AU)

(73) Assignee: Arbor Networks, Inc., Westford, MA (US)

(21) Appl. No.: 18/237,877

(22) Filed: Aug. 24, 2023

Related U.S. Patent Documents

Reissue of:
(64) Patent No.: 11,153,334
Issued: Oct. 19, 2021
Appl. No.: 16/379,240
Filed: Apr. 9, 2019

(51) Int. Cl.
*G06F 11/00* (2006.01)
*H04L 9/40* (2022.01)
*H04L 29/06* (2006.01)

(52) U.S. Cl.
CPC ..... *H04L 63/1416* (2013.01); *H04L 63/1425* (2013.01); *H04L 63/1458* (2013.01)

(58) Field of Classification Search
CPC ..... H04L 63/1408; H04L 63/20; H04L 45/38; H04L 63/1458; H04L 63/1425; H04L 63/1416; H04W 12/08
See application file for complete search history.

(56) References Cited

U.S. PATENT DOCUMENTS 9,848,378 B2 * 12/2017 Anpat ..... H04W 48/20
10,142,227 B2 * 11/2018 Thubert ..... H04L 45/16
(Continued)

FOREIGN PATENT DOCUMENTS

WO WO-2004059448 A2 * 7/2004 ..... H04L 43/028

OTHER PUBLICATIONS

Final Office Action on U.S. Appl. No. 16/379,240 Dtd Mar. 10, 2021.

(Continued)

*Primary Examiner* — Minh Dieu Nguyen
(74) *Attorney, Agent, or Firm* — Foley & Lardner LLP

(57) ABSTRACT

A method of detecting patterns in network traffic is provided. The method includes receiving packets of network traffic, performing a frequency analysis per field of the packets as a function of frequency of the occurrence of the same data in the corresponding field, and selecting top values which are values associated with each field of the set of fields that satisfy a criterion as having occurred most frequently in the packets as a function of a result of the frequency analysis. The method further includes assigning a bit encoding scheme that uses variable bit encoding to encode each of the top values for each field that has a top value, encoding into a single value each packet of the packets based on a bitfield representation that uses the encoding scheme for values associated with each field that has a top value, storing each potential combination of fields of the set of fields being processed, with all bits set per field when the field is an active field and no bits set when the field is inactive, performing a bitwise operation on each encoded packet with the stored potential combinations, sorting the results of the bitwise operation based on a number of the active fields and a number of occurrences of each same result of the bitwise operation, and providing the results of the sorting to a mitigation device for determining whether an attack is underway and/or for filtering network traffic for mitigating an attack.

20 Claims, 3 Drawing Sheets

(56) References Cited

U.S. PATENT DOCUMENTS

2005/0108617 A1* 5/2005 Lappin, Jr. ..... H04L 69/22 714/781
2005/0120208 A1* 6/2005 Albert Dobson ... H04L 63/0428 713/160
2005/0234915 A1* 10/2005 Ricciulli ..... H04L 63/1441
2007/0089171 A1* 4/2007 Aharon ..... G06F 21/55 726/22
2007/0204060 A1* 8/2007 Higuchi ..... H04L 63/1416 709/234
2008/0170625 A1* 7/2008 Tian ..... H04N 19/132 375/240.23
2008/0271146 A1* 10/2008 Rooney ..... H04L 63/1425 726/23
2011/0093694 A1* 4/2011 Nedbal ..... H04L 63/1416 713/150
2011/0182361 A1* 7/2011 Nakamura ..... H03M 7/42 375/240.16
2014/0201838 A1* 7/2014 Varsanyi ..... G06F 21/552 726/23
2016/0323302 A1* 11/2016 Teixeira ..... H04L 69/22
2017/0142238 A1* 5/2017 Gligoroski ..... H03M 7/00
2018/0248908 A1* 8/2018 Bjarnason ..... H04L 63/1458
2020/0099981 A1* 3/2020 Zhang ..... H04N 21/442
2020/0329054 A1* 10/2020 Bjarnason ..... H04L 63/1416
2020/0329069 A1* 10/2020 Bjarnason ..... H04L 63/1458

OTHER PUBLICATIONS

Non-Final Office Action on U.S. Appl. No. 16/379,240 Dtd Nov. 12, 2020.
Notice of Allowance on U.S. Appl. No. 16/379,240 Dtd Sep. 29, 2021.

* cited by examiner

AUTOMATIC DETECTION OF MALICIOUS PACKETS IN DDOS ATTACKS USING AN ENCODING SCHEME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATIONS*

*This application is a reissue of U.S. Pat. No. 11,153,334, issued on Oct. 19, 2021, entitled AUTOMATIC DETECTION OF MALICIOUS PACKETS IN DDOS ATTACKS USING AN ENCODING SCHEME," which patent and the application are incorporated herein by reference in its entirety.*

FIELD OF THE DISCLOSURE

Embodiments of the present disclosure relate generally to methods and systems for malware detection and mitigation, and specifically to algorithmically detecting malicious packets in Distributed Denial of Service ("DDoS") attacks using an encoding scheme.

BACKGROUND OF THE DISCLOSURE

Attacks, such as attacks utilizing flooding, denial of service, DDoS, viruses, worms, Trojan horses, rogue applications, malware, exploits, spam, phishing, etc., are becoming an ever-increasing problem in today's Internet. For example, by sending large amounts of malicious packets, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

DDoS attacks may be aimed at different types of services available on a network including, for example, DNS, HTTP (e.g., web traffic), encryption, time services, streaming services, VoIP. DDoS attacks may be aimed at vulnerable corporate services such as, for example, DNS that translates Internet names to addresses. DDoS attacks targeting DNS come in mainly two varieties. One attempts to shut down the DNS system specifically in relation to the target site so that no legitimate user can obtain a valid translation and make a request from that site, such as by altering the operation of the DNS server to provide an invalid translation. Another type of DDoS attack attempts to overload a DNS server directly with a flood of malicious packets that exceeds the capacity of the server, thereby preventing access to all sites whose address translations are dependent thereon.

Once an attack is successfully detected, standard mitigation tactics are typically inadequate in resolving a DDoS attack. Typical mitigation policies involve discarding all packets destined to a victim server without analyzing whether the packets originated from a legitimate user or an attacker. Also, standard approaches do not offer the ability to export real-time data to other apparatuses, nor do they allow an operator to configure a flexible, customized policy. It should be noted that, in many cases, the malicious packets sent by the attackers have similar structure and layout which, if detected, may be used to drop the malicious packets.

As such, a new, scalable, and robust DDoS Detection and Mitigation approach with inherent intelligence, which addresses all the shortcomings discussed above, is desirable. Such an approach should be capable of maintaining accurate state information to check for anomalous traffic patterns (to detect a variety of high rate DDoS attacks), should be capable of distinguishing between an attacker and a legitimate user when an attack is detected, should allow an operator to configure a flexible mitigation policy, and should be capable of operating without degrading the overall system performance (forwarding data path or control plane CPU).

SUMMARY OF THE DISCLOSURE

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method of detecting patterns in network traffic is provided. The method includes receiving packets of network traffic, performing a frequency analysis per field of the packets as a function of frequency of the occurrence of the same data in the corresponding field, and selecting top values which are values associated with each field of the set of fields that satisfy a criterion as having occurred most frequently in the packets as a function of a result of the frequency analysis. The method further includes assigning a bit encoding scheme that uses variable bit encoding to encode each of the top values for each field that has a top value, encoding into a single value each packet of the packets based on a bitfield representation that uses the encoding scheme for values associated with each field that has a top value, storing each potential combination of fields of the set of fields being processed, with all bits set per field when the field is an active field and no bits set when the field is inactive, performing a bitwise operation on each encoded packet with the stored potential combinations, sorting the results of the bitwise operation based on a number of the active fields and a number of occurrences of each same result of the bitwise operation, and providing the results of the sorting to a mitigation device for determining whether an attack is underway and/or for filtering network traffic for mitigating an attack.

In embodiments, before encoding each packet, fields of the set of fields that are determined to be highly variable based on the frequency analysis result can be excluded from further analysis.

In embodiments, a field of the set of fields can be determined to be highly variable when there are no top values determined for the field.

In accordance with embodiments, the criterion as having occurred most frequently can be satisfied when the value occurs in the field a threshold percentage of times relative to other values that occur in the field for the plurality of packets.

Furthermore, in accordance with embodiments, when generating the single value per packet, the bit size for each field can be determined by the cardinality for the field based on the frequency analysis.

In embodiments, the single value can be generated for only those packets that have a top value determined for each of its fields.

Additionally, in embodiments, the bitwise operation can be a logical AND operation.

In embodiments, the method can further include creating a sparse memory array and storing results of the bitwise operation in the sparse array. The sparse memory array can be sized as a function of a number of bits per packet in the single value.

In embodiments, the method can further include decoding top entries of the sorted sparse memory array and generating a filter that includes data from the decoded top entries.

Furthermore, in embodiments, the method can further include filtering the network traffic using the filter.

In addition, in accordance with embodiments, selecting a template for mitigating the attack can be based on the results of the sorting.

In embodiments, the method can further include obtaining results of the sorting when an attack is not underway and comparing the results of the sorting when an attack is not underway to results of the sorting during network operations to determine when an attack is underway.

Furthermore, in embodiments, the plurality of packets of network traffic can be streaming and the results of the sorting can be updated and provided to the mitigation device in real time.

In embodiments, the method can further include aggregating results of the sorting from a plurality of different positions in the network, a plurality of different networks, and/or a plurality of different times.

In accordance with another aspect of the disclosure, a network monitoring system is provided, wherein the network monitoring system is configured and operable to receive a plurality of packets of network traffic, each packet having data associated with respective fields of a set of fields; perform a frequency analysis per field of the plurality of packets as a function of frequency of the occurrence of the same data in the corresponding field, and select top values which are values associated with each field of the set of fields that satisfy a criterion as having occurred most frequently in the plurality of packets as a function of a result of the frequency analysis. The network monitoring system is further configured and operable to assign a bit encoding scheme that uses variable bit encoding to encode each of the top values for each field that has a top value. Furthermore, the network monitoring system is further configured and operable to encode into a single value each packet of the plurality of packets based on a bitfield representation that uses the encoding scheme for values associated with each field that has a top value and store each potential combination of fields of the set of fields being processed, with all bits set per field when the field is an active field and no bits set when the field is inactive. A bitwise operation is performed on each encoded packet with the stored potential combination and the results of the bitwise operation are sorted based on a number of the active fields and a number of occurrences of each same result of the bitwise operation. The network monitoring system is further configured and operable to provide the results of the sorting to a mitigation device for determining whether an attack is underway and/or for filtering network traffic for mitigating an attack.

In embodiments, before encoding each packet, fields of the set of fields that are determined to be highly variable based on the frequency analysis result can be excluded from further analysis.

Furthermore, in embodiments, generating the single value per packet can further include determining the bit size for each field by the cardinality for the field based on the frequency analysis.

In embodiments, the network monitoring system can be further configured and operable to create a sparse memory array and store results of the bitwise operation in the sparse array, wherein the sparse memory array can be sized as a function of a number of bits per packet in the single value.

In embodiments, the network monitoring system can be further configured and operable to decode top entries of the sorted sparse memory array and generate a filter that includes data from the decoded top entries.

Furthermore, in embodiments, the network monitoring system can be further configured and operable to filter the network traffic using the filter.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
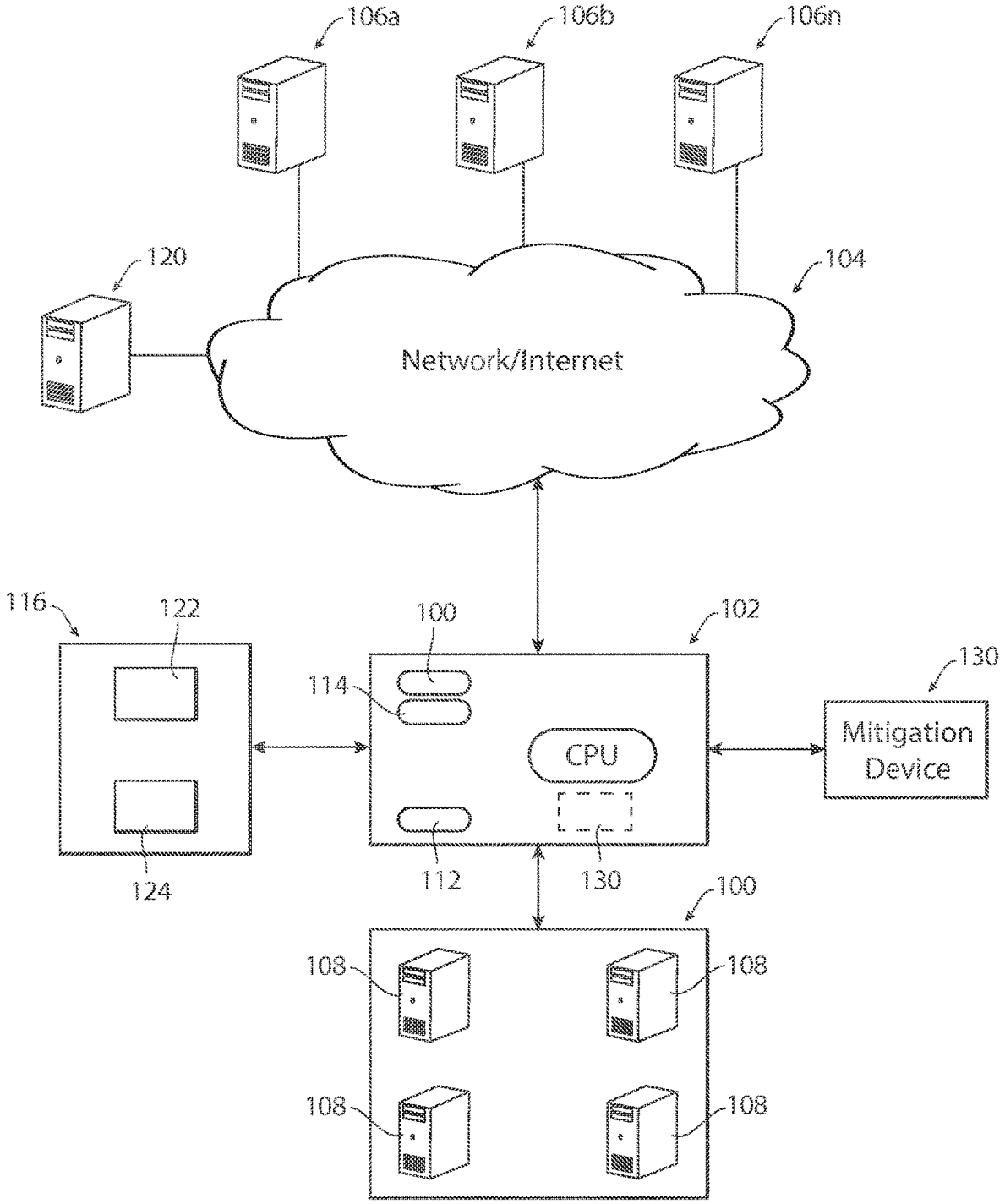
FIG. 1 is a schematic diagram showing network architecture and the relationship between an attack monitor device and protected network according to one embodiment of the present disclosure.

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below can be configured as a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present disclosure describe a system, apparatus and method for detecting, avoiding, and/or mitigating the harmful effects of a DDoS attack on a computer system/device or network.

Turning now descriptively to the drawings, in which similar reference characters denote similar elements throughout the several views, FIG. 1 illustrates the relationship between a protected network 100, attack monitor device 102, Internet 104, and external host devices 106a, 106 b . . . 106 n.

In a typical implementation, the external host devices 106 a, 106 b . . . 106n (also referred to as external devices or host devices) attempt to connect to protected devices 108 within the protected network 100, typically via a private network or a public computer network such as the Internet 104. Examples of external host devices include servers, laptops, desktop computers, tablet devices, mobile phones, mobile computing devices, video games systems, televisions, and other similar devices and systems having Internet connectivity.

The attack monitor device 102 can be configured, for example, similar to devices such as Arbor Edge Defense™ or Arbor Sightline™ by Arbor Networks, Inc. of Westford Mass. In embodiments, the protected network 100 protected by the attack monitor device 102 can be located between the Internet 104 and the protected network 100. In embodiments, the protected network 100 can be an enterprise network, such as a school network, business network, and government network, to list a few non-limiting examples. In other embodiments, the attack monitor device 102 is located within the Internet, service provider network, or enterprise network, rather than as a network edge as illustrated. It is to be appreciated that when deployed within the protected network, traffic can be diverted to the attack monitor device 102.

The attack monitor device 102 can include a packet processing system having an external high-speed network interface 110 and a protected high-speed network interface 112. Under current technology, these interfaces are capable of handling 1.0-100 Gbps, for example. The attack monitor device 102 may further include processors 114 that can process the packets received at interfaces 110 and 112. Additionally, a central processing unit (CPU), random access memory (RAM), and a storage medium 116 are used to further support the processing of the received packets, and are described in detail below in conjunction with FIG. 3. The storage medium 116 can also store results tables 124 used in the below described pattern detection process as well as other possible information, such as predefined filter rules. The attack monitor 102 can provide information to an attack mitigation device 130 or include an attack mitigation device that can generate alerts and/or assert countermeasures against an attack, such as to apply a filter using information provided by the attack monitor 102, such as to block, redirect, or drop packets detected by the filter.

In one implementation, the attack monitor device 102 authenticates all external host devices 106 a, 106 b . . . 106 n before allowing them to access the protected devices 108 within the protected network 100.

To protect against DoS attacks, the attack monitor device 102 distinguishes between requests from legitimate hosts 106a-106n and attack traffic from attacking host 120 by performing an analysis procedure that combines content analysis applied to selected fields and statistical analysis using variable bit-encoding and application of bitwise operations, with results stored in a sparse array. The term "bitwise operation" refers to an operation performed on two bit patterns of equal lengths by positionally matching their individual bits to perform an operation on each pair of matched bits. Advantageously, the attack monitor device 102 can perform the analysis either on live or stored network traffic. In either case, the results of such analysis can enable the attack monitor device 102 to provide sophisticated attack protection services, such as blocking packets matching the detected patterns in attack traffic, including in an automated fashion without the need for operator intervention.

As noted above, typically, the attack monitor device 102 may employ a combination of different analysis procedures/algorithms (e.g., content analysis applied to selected fields and statistical analysis using variable bit-encoding and application of bitwise operations). The attack monitor device 102 stores the results of the combined analysis in a data structure, such as a sparse memory array 124. The sparse memory array 124 stores a result of the bitwise operations that are performed to compare bit-encoded packets of the subset of network traffic to entries in the unique combinations table 122. The unique combinations table 122 is a data structure that stores each potential unique combination of the selected fields. When determining the unique combinations, fields that have multiple bits are limited to having either a value of "0" for all bits (inactive) or "1" for all bits (active). As used herein, the term "structured data" refers to data that is defined or organized according to a fixed structure.

The sparse memory array 124 can be generated during the analysis once the number of selected fields and number of bits for to be used for variable bit-encoding is determined. The sparse memory array 124 is generated by allocating a fixed amount of memory for the sparse memory array 124 based on the number of bits used in the variable bit-encoding applied to the selected fields. The sparse memory array 124 also includes a counter per entry that keeps track of the number of times each entry matches a result of the bitwise operation performed on a packet.

The sparse memory array 124 can then be sorted, e.g., based on a score. These entries having the highest score represent data patterns that occur most frequently in the snapshot subset of network traffic. These patterns are most likely to be representative of suspicious traffic. Accordingly, the entries having the highest score can be used to generate a filter.

The filter can be applied by the attack monitor device 102, and/or a different threat management device, to manage the network traffic, such as to block, divert, or drop packets. The filter can be shared with other threat management devices for mitigating attacks to network traffic generated in different areas of the protected network 100 or for use mitigating attacks to other networks, such as other protected networks. The sparse memory array 124 can be sorted (meaning the score can be generated) based on more than one factor. In the example shown, the sparse memory array 124 is sorted based on two factors. One factor is the value of the counter associated with the entries. The other factor is the number of fields in the entry that are active, meaning set to "1".

At least some of the protected devices 108 (e.g., DNS servers) may handle millions of requests every hour from many different external devices 106a-106n. Attack mitigation that analyzes characteristics of individual packets can be overwhelmed by the large volume of attack traffic and the large number of unique host addresses due to consumption of system resources, which can cause conventional DDoS protection solutions to be ill-suited to mitigate large-scale attacks.

Advantageously, the embodiments disclosed herein offer a novel approach that can detect and mitigate a large-scale attack campaign, event when a vast number of attack tools participate in attacking the protected network 100. As discussed further below, the attack monitor device 102 is configured to utilize content analysis applied to selected fields and statistical analysis using variable bit-encoding and application of bitwise operations, with results stored in a sparse array to detect attack patterns with increased speed and precision than existing malicious attack mitigation solutions, providing increased effectiveness and an ability to swiftly respond to changes in attack patterns. In various embodiments, the combination of content analysis applied to selected fields and statistical analysis using variable bit-encoding and application of bitwise operations, with results stored in a sparse array, enables the attack monitor device 102 to automate the "detect-mitigate-analyze results" cycle without the need for operator intervention, thereby reducing time used to detect and mitigate sophisticated attacks. User experience is improved due to the improved speed and effectiveness of attack mitigation.

According to exemplary configuration illustrated in FIG. 1, the attack monitor device 102 may comprise a Client Edge (CE) device. The CE device can provide entry points into the protected network 100. In alternative configuration, the attack monitor device 102 may comprise a virtual device. In other words, at least some of the embodiments do not require the attack monitor device 102 to be a physical hardware device or to be located in a particular part of the network infrastructure, as long as the attack monitor device 102 can be in the path of the incoming traffic to the protected network 100.

Figure 2:
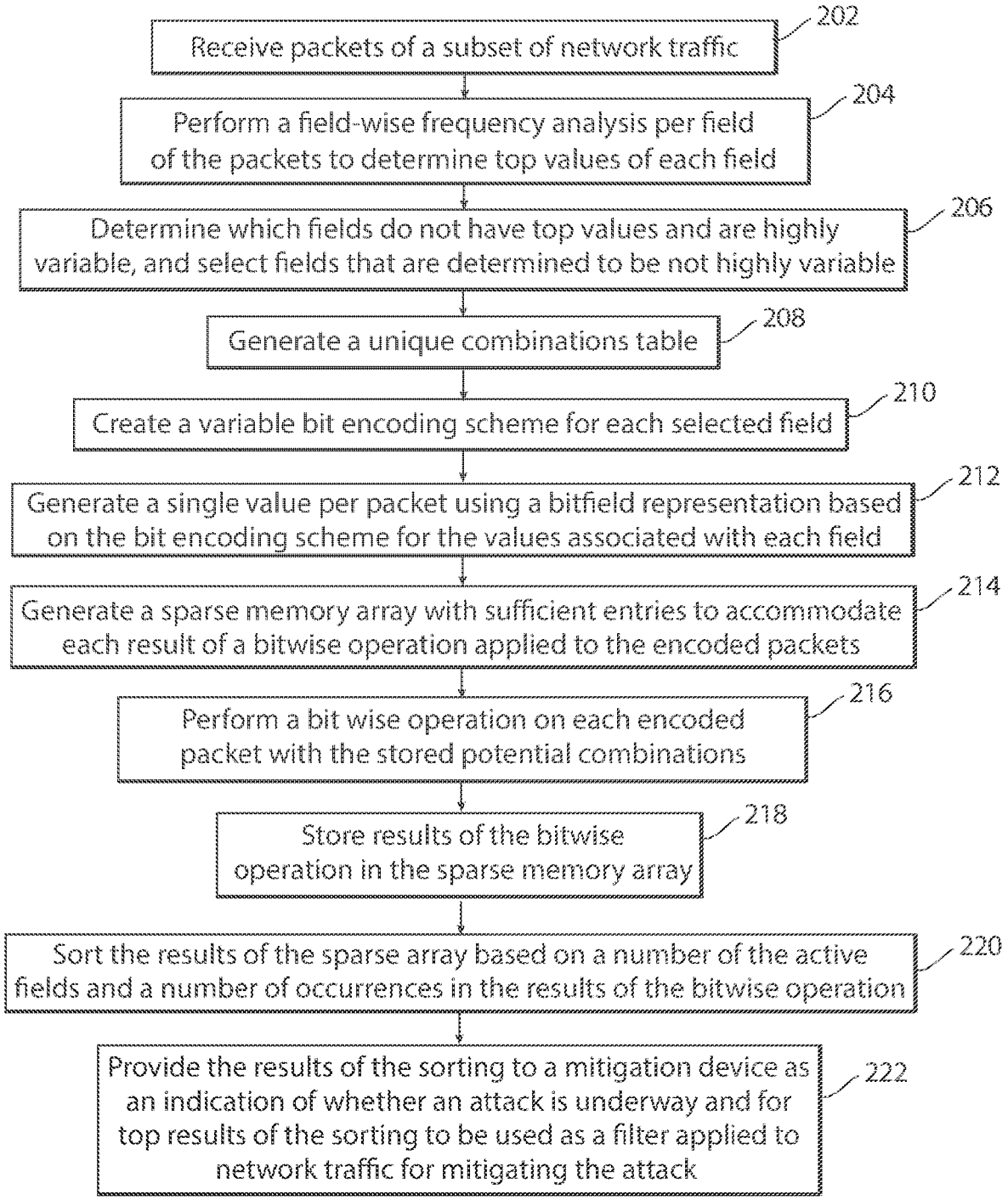
FIG. 2 is a flowchart illustrating a method for detecting patterns using statistical analysis in accordance with the illustrated embodiments.

FIG. 2 shows exemplary and non-limiting flowcharts illustrating methods for mitigating network attacks in accordance with certain illustrated embodiments. The methods can be performed by an attack monitor device, such as attack monitor device 102. Before turning to description of FIG. 2, it is noted that the flowchart in FIG. 2 shows an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, on or more of the steps can be omitted.

While the embodiments describe the network attack monitor device with specific reference to steps directed to detect security and performance issues and/or mitigate detected breaches of a security policy, alternative data analyzing devices may be used provided they are adapted to apply content-specific logic to processing structured data in order to detect underlying patterns using variable bit-encoding and applying bitwise operations to encoded packets.

Existing security solutions for different types of networks typically identify attacks by either analyzing individual packets for malicious content (such systems as, but not limited to, Intrusion Detection Systems (IDS) and Intrusion Protection Systems (IPS)) or by counting how many times a specific value is seen in packet flow (e.g., Netflow analysis systems). Even under ideal circumstances, significant computing resources are required to perform such analysis on pre-stored network data. In contrast, various embodiments of the present disclosure contemplate an alternative approach that utilizes content analysis applied to selected fields and statistical analysis using variable bit-encoding and application of bitwise operations, combined with results stored in a sparse array to efficiently detect underlying attack patterns either in live network data, which can be detected and/or mitigated in situ in real time, or stored network traffic data. In one embodiment described below, to protect against DDoS attacks, the attack monitor device 102 utilizes this approach to take a snapshot of attack traffic (either volume or time based) and then calculate how often both the content of individual packet header fields and unique combinations of field content appear in the attack traffic.

More specifically, at operation 202, the attack monitor device 102 receives a subset of network traffic. For example, this subset of network traffic may include a subset (snapshot) of the traffic flow records. In one embodiment, the attack monitor device 102 may obtain data that is representative of particular network traffic transmitted over a network during a particular time interval which may be loaded, for example, from a Packet Capture (PCAP) file or some other type of log file. In another embodiment, packets flowing through the network may be intercepted from a live data stream and analyzed in real time by the attack monitor device 102 to detect whether or not one or more components of the protected network 100 are being attacked and/or to protect the one or more protected components 108 from being overloaded. In some embodiments, functionality of the attack monitor device 102 may include selective interception of packets, selective modification of those intercepted packets and the subsequent release/reinsertion of the packets, modified or unmodified, and/or release of new packets, back into the general stream of network traffic.

The packets each include a header with a plurality of fields. The header includes data associated with each of the fields. Examples of fields include source IP, source port, destination IP, and destination port. Additionally, each packet has a packet length.

At operation 204, a first phase of the method is begun. A frequency analysis is applied to each field of the header of the received packets to determine top values in which a top value occurs at least 100/N % times of a total T of the number of the total number of packets in the subset of received network traffic. N can be a configurable variable.

At operation 206, the frequency analysis is used to determine and eliminate fields that are highly variable, with the remainder of fields (those fields that are not determined to be highly variable) being selected. A field is determined to be variable based on a criterion that is a function of the frequency analysis. In one non-limiting example, the field is determined to be highly variable, for example, when there are no top values determined for that field.

In embodiments, the frequency analysis can also be used to determine which fields are moderately variable. The values in a moderately variable field do not occur as frequently as the top values determined using 100/N %*T. For example, a field can be determined to be moderately variable when there are no values that occurred at least 100/(N+X) % of T times, wherein X is a selectable value that is smaller than N. In a non-limiting example, X=1. In embodiments, a counter can be incremented for each analysis in which a field is determined to be a moderately variable field. The field can be upgraded after repeated analyses to be a selected field, meaning it is a non-variable field, when the counter reaches a selected threshold.

Similarly, a field can be considered a moderately variable field if it has a top value, but would not have a top value for 100/(N−Y) % of T time, wherein Y is a selectable value that is smaller than N. A second counter can be incremented for each analysis in which the field is determined to be moderately variable, and the field is downgraded to being a variable field that is not selected when the second counter reaches a second selected threshold.

The following operations (e.g., operations 208-222) will only be performed using the selected fields, which greatly reduces the complexity and resources used for performing the following operations.

At operation 208, a second phase of the method is begun, in which the second phase is applied using only the selected fields. At operation 208, a data structure, such as a unique combinations table 122, is generated and populated. Memory space for the unique combinations table 122 can be allocated after operation 206 is completed, based on the selected fields. For S selected fields, the unique combinations table 122 is provided with $2^S-1$ entries so that an entry is available for each possible combination of the selected fields being active or inactive (optionally not including an entry for a combination in which all fields are inactive, in which all bits equal zero). By only using selected fields, the number of combinations stored in the unique combinations table 122 can be reduced by a factor of 2 for each field that is not selected.

Each entry has one or more bits that correspond to each selected field. The number of bits assigned for each field is sufficient to support a unique bit encoding for each top value determined for that field. When the field is active, all bits assigned to the field are set to "1." When the field is inactive, all bits assigned to the field are set to "0." The unique combinations table 122 is populated with each unique combination of the selected fields being active or inactive.

At operation 210, a bit encoding scheme is created for each selected field, in which a unique bit combination is assigned to each top value of the field. The number of bits used per field is a function of the cardinality for that field, which is sufficient to encode each top value determined for that field. If seven top values were determined for the field, then three bits are allotted for encoding that field.

At operation 212, each packet of the subset of network traffic is encoded by assigning it a single value using a bitfield representation for only the selected fields. Each field is encoded using the encoding scheme created at operation 210 by encoding the field with the unique bit combination assigned to the value in the field when the value is a top value. In embodiments, if the value in the field is not a top value, then the entire packet is skipped. Accordingly, if the value in any of the fields is not a top value, the entire packet is skipped. The single value assigned to each packet has B bits, where B is the total number of bits used to encode each of the selected field.

The advantage to skipping packets that do not have a top value further reduces the amount of data to be processed, conserving time and computing resources, particularly when keeping in mind that network traffic can include a very large number of packets. The best data for detecting an attack is still retained, namely packets that include a top value in every field. At operation 214, the sparse memory array 124 is generated with $2^B$ entries, which is a sufficient amount of entries to accommodate each result of a bitwise operation applied to the encoded packets. The sparse memory array 124 is populated with all of the potential results of a bitwise operation performed at operation 216. Accordingly, each entry of the sparse memory array 124 stores a unique combination of the B bits. Additionally, each entry is provided with a counter field that is used to track the number of times that entry's combination of bits matches a result of the bitwise operation performed at operation 216.

At operation 216, the bitwise operation is performed on each encoded packet of the subset of network traffic with each entry of the unique combinations table 122. In an example embodiment, performance of the bitwise operation includes performing a bitwise logic AND operation to the encoded packet and each of the respective entries of the unique combinations table 122. Accordingly, the bitwise AND operation is performed $2^S-1$ times per encoded packet, once for each entry of the unique combinations table 122.

At operation 218, results of the bitwise operations performed for each encoded packet is stored in the sparse memory array 124 by incrementing the counter of the entry in the sparse memory array 124 that matches the result of each of the bitwise operations.

At operation 220, the entries of the sparse memory array 124 are sorted based on a number of the active fields (meaning bits that equal "1") in each entry and the entry's counter value.

At operation 222, a result of the sorting is provided to attack mitigation device 130. The sorted result can be an indication of whether an attack is underway, including which type of attack is underway. The top entries of the sorted sparse memory array 124 can be decoded and provided to the attack mitigation device 130 to be used as a filter that can be applied to network traffic for mitigating the attack.

The decoded top entries of the sorted sparse memory array 124 represent data patterns that occur most frequently in the snapshot subset of network traffic. When an attack is underway, these patterns are most likely to be representative of suspicious traffic and can be used effectively to detect or filter an attack during network operation.

The decoded top entries of the sorted sparse memory array 124 can be updated and displayed in real time, providing an operator a real time view of current traffic patterns and the ability to view changes in traffic patterns in real time.

In embodiments, the attack monitor device 102 can include the attack mitigation device 130 and use the results of the sorting to detect and/or mitigate an attack to generate an alert or apply countermeasures, such as applying a filer that uses the decoded top entries.

The top entries can be indicative of the type of attack. Accordingly, the attack mitigation device 130 can use the information provided by the sorted sparse memory array 124 and/or its top entries to automatically determine the type of attack and automatically enable countermeasures that are specific to the determined type of attack, and disable countermeasures that are not relevant to the determined type of attack. The advantage provided is avoidance of unneeded countermeasures than can interfere with healthy network traffic.

The information provided by the sorted sparse memory array 124 and/or its top entries can also be used to select a template to use for applying countermeasures, wherein the template is targeted for the specific type of attack that was detected. The method can be applied to a snapshot of healthy network traffic. In other words, the subset of network traffic received for by the attack monitor device 102 can be a sample of healthy network traffic. Analysis of the sorted sparse memory array 124 could give information about regarding which Secure Sockets Layer/Transport Layer Security (TLS/SSL) encryption protocol combinations or which HTTP User Agents are most commonly used. This information can be used to simplify detection of abnormal network traffic patterns during an attack.

The method can then be applied in real time to streaming network traffic. The sorted sparse memory array 124 results can be compared in real time to the results obtained using a sample of healthy network traffic for detection of an attack.

In addition, the sorted sparse memory array 124 results can be used to visualize network traffic activity to obtain information of interest.

Operation of the method is now illustrated in an example application. The example is shown on a small scale, but one skilled in the art will recognize that it can be applied to large-scale network traffic of a network environment.

In the example, TABLE 1 below, a snapshot of network traffic shown below includes ten packets, of which six packets (in rows 1, 3, 4, 6, 8 and 10) are generated by an attacker:

TABLE 1

| Source IP | Source port | Destination IP | Destination port | Packet length |
|---|---|---|---|---|
| 1.2.3.4 | 1234 | 10.2.55.87 | 80 | 55 |
| 4.5.6.7 | 1234 | 10.2.55.87 | 80 | 230 |
| 8.9.10.11 | 5324 | 10.2.55.87 | 80 | 55 |
| 12.13.14.15 | 8774 | 10.2.55.87 | 80 | 55 |
| 16.17.18.19 | 3433 | 10.2.55.87 | 80 | 165 |
| 21.22.23.24 | 5324 | 10.2.55.87 | 80 | 55 |
| 20.21.22.23 | 8879 | 10.2.55.87 | 80 | 255 |
| 11.12.13.14 | 1234 | 10.2.55.87 | 80 | 55 |
| 24.25.26.27 | 4234 | 10.2.55.87 | 80 | 175 |
| 28.29.30.31 | 8774 | 10.2.55.87 | 80 | 55 |

During the first phase, a frequency analysis is performed to determine the top values using 100/N %*T, wherein N=7. If the field does not include any top values, meaning it is highly variable, that field is not considered for further analysis, reducing the number of fields to be analyzed and reducing the number of combinations to be included in the unique combinations table 122 by a factor of 2.

The result of the frequency analysis is shown in TABLE 2, which shows that the field "Source IP" is a highly variable field that will not be considered further during the analysis.

TABLE 2

| Source IP | Source port | Destination IP | Destination port | Packet length |
|---|---|---|---|---|
| <none> | 1234 (3)<br>8774 (2)<br>5324 (2) | 10.2.55.87 (10) | 80 (10) | 55 (6) |

TABLE 2 shows that the selected fields include "Source port," which has three top values, and "Destination IP," "Destination port," and "packet length," which have one top value each.

An encoding scheme is determined for the top values of the selected fields using variable binary bit encoding as shown:

The "Source port" field is represented by two bits in order to encode the three top values.

'01' representing the value "1234"

'10' representing the value "8774"

'11' representing the value "5324"

The "Destination IP" field is represented by a single bit where '1' represents the value "10.2.55.87"

The "Destination port" field is represented by a single bit where '1' represents the value "80"

The "Packet length" field is represented by a single bit where '1' represents the value "55"

The unique combinations table 122 is generated with combination of inactive and active values for each of the selected fields. Since active values are represented with all bits set, the "Source port" field is represented as either '00' or '11.'

Since there are four selected fields, S=4, the unique combinations table 122 is generated to include an array with up to $2^4-1$, meaning 15 entries. The entries of the unique combinations table 122 are:

00 0 0 1
00 0 1 0
00 0 1 1
00 1 0 0
00 1 0 1
00 1 1 0
00 1 1 1
11 0 0 0
11 0 0 1
11 0 1 0
11 0 1 1
11 1 0 0
11 1 0 1
11 1 1 0
11 1 1 1

Each packet of the snapshot of network traffic is encoded into a bitfield representation, which can be presented as a single multibit value, using the encoding scheme. If the field value for any of the packets is not included in the determined top values, that entire packet is skipped, and the encoding process proceeds with the next packet in the snapshot of network traffic. TABLE 3 shows the encoded packets of the snapshot shown in TABLE 1, in which four of the packets are skipped.

TABLE 3

| Source port | Destination IP | Destination port | Packet length |
|---|---|---|---|
| 01 | 1 | 1 | 1 |
| ~~01~~ | ~~1~~ | ~~1~~ | ~~<none>~~ |
| 11 | 1 | 1 | 1 |
| 10 | 1 | 1 | 1 |
| ~~<none>~~ | ~~1~~ | ~~1~~ | ~~<none>~~ |
| 11 | 1 | 1 | 1 |
| ~~<none>~~ | ~~1~~ | ~~1~~ | ~~<none>~~ |
| 01 | 1 | 1 | 1 |
| ~~<none>~~ | ~~1~~ | ~~1~~ | ~~<none>~~ |
| 10 | 1 | 1 | 1 |

The six remaining encoded packets are shown below:

01 1 1 1
11 1 1 1
10 1 1 1
11 1 1 1
01 1 1 1
10 1 1 1

A logical AND bitwise operation is applied to the encoded single value of each of the six remaining packets packet against each of the combinations included in the 15 entries of the unique combinations table 122.

A sparse memory array 124 is generated to hold the potential results of the bitwise AND operation, which increases the speed of the analysis process. Since B=5, bits, the sparse memory array 124 is allocated to have $2^{5-1}$ entries (meaning 31 entries), without any entry included in the example for the entry "00000."

As each result of the bitwise AND operation is generated, the result is used as a direct index into the sparse memory array 124 to increment the counter associated with the entry having the index.

In the example shown, the counter values for a sample of the sparse memory array entries is shown:

[00 0 0 1]=6. This indicates that the value "55" for packet size has been seen 6 times.

[00 0 1 0]=6. This indicates that the value "80" for destination port has been seen 6 times.

[00 0 1 1]=6. This indicates that the value "80" for destination port AND the value "55" for packet size has been seen 6 times.

[00 1 0 0]=6. This indicates that the value "10.2.55.87" "80" for destination IP has been seen 6 times.

[00 1 0 1]=6. This indicates that the combination "10.2.55.87" for destination IP AND "55" for packet size has been seen 6 times.

[00 1 1 0]=6. This indicates that the combination "10.2.55.87" for destination IP AND "80" for destination port has been seen 6 times.

[00 1 1 1]=6. This indicates that the combination "10.2.55.87" for destination IP AND "80" for destination port AND "55" for packet size has been seen 6 times.

[01 0 0 0]=2. This indicates that the value "1234" for source port has been seen 2 times.

[10 0 0 0]=2. This indicates that the value "8774" for source port has been seen 2 times

[11 0 0 0]=2. This indicates that the value "5324" for source port has been seen 2 times <skipping 18 combinations for brevity>

[01 1 1 1]=2. This indicates that the combination "1234" for source port, "10.2.55.87" for destination IP, "80" for destination port and "55" for packet size has been seen 2 times.

[10 1 1 1]=2. This indicates that the combination "8774" for source port, "10.2.55.87" for destination IP, "80" for destination port and "55" for packet size has been seen 2 times.

[11 1 1 1]=2. This indicates that the combination "5324" for source port, "10.2.55.87" for destination IP, "80" for destination port and "55" for packet size has been seen 2 times.

Top entries of the sparse memory array 124 are determined by sorting the sparse memory array 124 based on both the number of fields per entry that are active and the value of the entry's counter. Based on these factors, TABLE 4 shows three entries of the sparse memory table 124 that are determined to be top entries:

TABLE 4

| Source port | Destination IP | Destination port | Packet length | Count |
|---|---|---|---|---|
| 1234 | 10.2.55.87 | 80 | 55 | 2 |
| 5324 | 10.2.55.87 | 80 | 55 | 2 |
| 8774 | 10.2.55.87 | 80 | 55 | 2 |

A high-fidelity filter can be automatically generated that uses a combination of the values for each of the selected fields included in the top entries as shown:

Source port is ={1234 or 5324 or 8774}
Destination IP=10.2.55.87
Destination port=80
Packet length=55

This filter can be provided to the attack mitigation device 130 for detecting and/or applying countermeasures to attack traffic.

Figure 3:
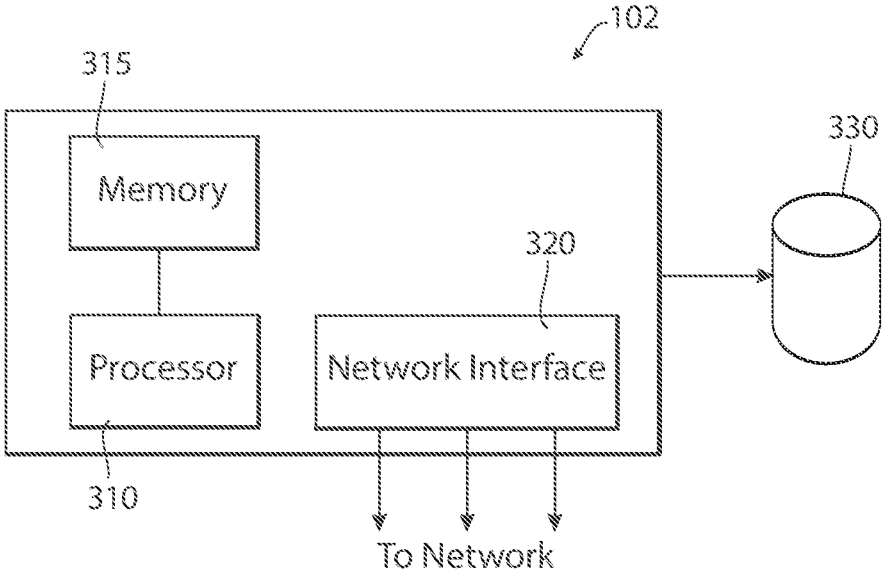
FIG. 3 is a block diagram of the attack monitor device of FIG. 1, in accordance with an embodiment of the present disclosure.

With reference now to FIG. 3, illustrated is an exemplary and non-limiting block diagram of the attack monitor device 102 constructed according to an illustrated embodiment. The attack monitor device 102 is communicatively coupled to the protected network 100 and to the database 330 (i.e., storage medium 116 storing the unique combinations table 122 and the sparse memory array 124 and/or storing network traffic flow information), as shown in FIG. 3, and is at least configured to execute the method for mitigating network attacks as described in greater detail above. The attack monitor device 102 can include a processor 310 coupled to a memory 315 and a network-interface module 320. The network-interface module 320 allows the communication with the protected network 100. The processor 310 uses instructions stored in the memory 315 to execute attack detection tasks as well as to control and enable the operation of the network-interface module 320.

Attack mitigation device 130, whether external or internal to the attack monitor device 102, includes a processor, memory and network interface, which can be fully or partially shared with the any of the respective processor, 310, memory 315, and network interface 320. The attack mitigation device 130, whether external or internal to the attack monitor device 102, can similarly be coupled to the protected network 100 and to the database 330.

In summary, various embodiments of the present disclosure disclose a novel approach to detecting data patterns by employing a combination of different analysis procedures/algorithms (e.g., content analysis and statistical analysis). In one embodiment, this approach takes a different perspective on how to provide an effective response to a DoS/DDoS type of attack than do conventional approaches. The disclosed approach provides a number of advantages. In one aspect, software-programming code embodying the present disclosure provides an ability to perform analysis either on live or stored network data. In another aspect, the attack monitor device 102 may use the results of the attack detection analysis to block packets matching detected patterns in an automated fashion. As yet another advantage, although the method depicted in FIG. 2 is described with reference to the IP packet header analysis, it is not limited thereto. The disclosed processing functionality performed by the attack monitor device 102 may be applicable to packet payload analysis, as well as any other structured data analysis.

The various embodiments disclosed herein can be implemented as any combination of hardware, firmware, and software. Moreover, the software can be implemented as an application program tangibly embodied on a program storage unit or computer readable medium. The application program may be uploaded to, and executed by, a machine comprising any suitable architecture. The machine can be implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method [of detecting patterns in network traffic, the method] comprising:

receiving a plurality of packets of network traffic, each packet having data associated with respective fields of a set of fields;

performing a frequency analysis per field of the plurality of packets as a function of frequency of an occurrence of same data in a corresponding field;

selecting top values [which are values] associated with each field of the set of fields that satisfy a criterion as having occurred most frequently in the plurality of packets as a function of a result of the frequency analysis;

[assigning a bit encoding scheme that uses variable bit encoding to encode] *encoding* each of the top values for each field that has a top value *using a variable bit encoding scheme*;

encoding into a single value each packet of the plurality of packets based on a bitfield representation that uses the *variable bit* encoding scheme for values associated with each field that has a top value;

storing each potential combination of fields of the set of fields being processed[, with all bits set per field when the field is an active field and no bits set when the field is inactive];

performing [a bitwise] *an* operation on each encoded packet with the stored potential combinations;

sorting results of the [bitwise] operation [based on a number of the active fields and a number of occurrences of each same result of the bitwise operation]; and

[providing the results of the sorting to a mitigation device for] determining whether an attack is underway or [for] filtering network traffic for mitigating an attack *based on the sorted results of the operation*.

2. The method of claim 1, wherein before encoding each packet, fields of the set of fields that are determined to be a variable based on the frequency analysis result are excluded from further analysis in which a top value occurs at least 100/N % times of a total T of the number of the total number of packets in the subset of received network traffic and wherein N is a configurable variable.

3. The method of claim 2, wherein a field of the set of fields is determined to be the variable when there are no top values determined for the field.

4. The method of claim 3, wherein the criterion as having occurred most frequently is satisfied when the value occurs in the field a threshold percentage of times relative to other values that occur in the field for the plurality of packets.

5. The method of claim 1, wherein when generating the single value per packet, [the] *a* bit size for each field is determined by [the] *a* cardinality for the field based on the frequency analysis.

6. The method of claim 1, wherein [the] *a* single value is generated for only those packets that have a top value determined for each of its fields.

7. The method of claim 1, wherein the [bitwise] operation is a logical AND operation.

8. The method of claim 1, further comprising:

creating a sparse memory array; and storing results of the [bitwise] operation in the sparse *memory* array, the sparse memory array being sized as a function of a number of bits per packet in [the] *a* single value.

9. The method of claim 8, further comprising:

decoding top entries of the sorted sparse memory array; and generating a filter that includes data from the decoded top entries.

10. The method of claim 9, further comprising filtering the network traffic using the filter.

11. The method of claim 1, further comprising selecting a template for mitigating the attack based on the results of the sorting.

12. The method of claim 1, further comprising:

obtaining results of the sorting when an attack is not underway; and comparing the results of the sorting when an attack is not underway to results of the sorting during network operations to determine when an attack is underway.

13. The method of claim 1, wherein the plurality of packets of network traffic are streaming and the results of the sorting are updated and provided to [the] *a* mitigation device in real time.

14. The method of claim 1, further comprising aggregating results of the sorting from a plurality of different positions in the network, a plurality of different networks, and/or a plurality of different times.

15. A network monitoring system comprising:

a memory;

a processor disposed in communication with the memory, and configured to issue a plurality of instructions stored in the memory, wherein the instructions cause the processor to:

receive a plurality of packets of network traffic, each packet *of the plurality of packets* having data associated with respective fields of a set of fields;

perform a frequency analysis per field of the plurality of packets as a function of frequency of an occurrence of same data in a corresponding field;

select top values [which are values] associated with each field of the set of fields that satisfy a criterion as having occurred most frequently in the plurality of packets as a function of a result of the frequency analysis;

[assign a bit encoding scheme that uses variable bit encoding to] encode each of the top values for each field that has a top value *using a variable bit encoding scheme*;

encode into a single value each packet of the plurality of packets based on a bitfield representation that uses the *variable bit* encoding scheme for values associated with each field that has a top value;

store each potential combination of fields of the set of fields being processed[, with all bits set per field when the field is an active field and no bits set when the field is inactive];

perform [a bitwise] *an* operation on each encoded packet with the stored potential combinations;

sort results of the [bitwise] operation [based on a number of the active fields and a number of occurrences of each same result of the bitwise operation]; and

[provide the results of the sorting to a mitigation device for] determining whether an attack is underway or [for] filtering network traffic for mitigating an attack *based on the sorted results of the operation*.

16. The network monitoring system of claim 15, wherein *the instructions further cause the processor to* before encoding each packet, *exclude* fields of the set of fields that are determined to be a variable based on the frequency analysis result [are excluded] from further analysis in which a top value occurs at least 100/N % times of a total T of the number of the total number of packets in the subset of received network traffic and wherein N is a configurable variable.

17. The network monitoring system of claim 15, wherein [generating the single value per packet, further comprises determining the] *the instructions further cause the processor to determine a* bit size for each field by [the] *a* cardinality for the field based on the frequency analysis.

18. The network monitoring system of claim 15, wherein [the network monitoring system is further configured and operable to] *the instructions cause the processor of the network monitoring system to*:

create a sparse memory array; and store results of the [bitwise] operation in the sparse *memory* array, the sparse memory array being sized as a function of a number of bits per packet in [the] *a* single value.

19. The network monitoring system of claim 18, wherein [the network monitoring system is further configured and operable to] *the instructions cause the processor of the network monitoring system to*:

decode top entries of the sorted sparse memory array; and generate a filter that includes data from the decoded top entries.

20. The network monitoring system of claim 18, wherein [the network monitoring system is further configured and operable to] *the instructions cause the processor of the network monitoring system to:* filter the network traffic using [the] *a* filter.

* * * * *